March 26, 1935.                R. E. STOLL                1,995,907
                           SHEET METAL PULLEY
                       Filed Aug. 8, 1931        2 Sheets-Sheet 1

Inventor
R. E. Stoll
by
Attorney

March 26, 1935.  R. E. STOLL  1,995,907
SHEET METAL PULLEY
Filed Aug. 8, 1931   2 Sheets-Sheet 2

Inventor
R. E. Stoll
by G. J. DelVin
Attorney

Patented Mar. 26, 1935

1,995,907

UNITED STATES PATENT OFFICE 1,995,907

SHEET METAL PULLEY

Robert E. Stoll, Wauwatosa, Wis., assignor to Allis-Chalmers Manufacturing Company, Milwaukee, Wis., a corporation of Delaware Application August 8, 1931, Serial No. 555,894

11 Claims. (Cl. 74—230.8)

This invention relates in general to the art of pulleys and relates more specifically to an improvement in multiple V-groove pulleys wherein the belt grooves are provided by inclined, annular driving flanges formed in two sets of circular sheet metal members mounted on cylindrical portions of a rotary mounting member.

An object of the invention is to provide multiple V-groove pulleys comprising two sets of circular, sheet metal members as related above, the members of each set having preferably the same diameter central opening for mounting the members on cylindrical portions of a shaft or on cylindrical portions of a hub member and the members of each set being provided with offset or nesting annular portions intermediate the inclined driving flanges and the central openings, to provide the desired stiffness and strength to the peripheral groove-defining portions of the pressed steel pulleys.

Another object of the invention is to provide multiple V-groove pulleys comprising two sets of circular sheet metal members having nesting portions, the members of the sets being formed so that they may be mounted on cylindrical portions of a shaft or hub member to form pulleys having any desired number of grooves, within practical limits, the pulleys, regardless of the number of grooves, being symmetrical about a diametrical plane passing through the medial portions of the grooved periphery thereof, which results in compactness and a self balanced condition in the pulleys.

Another object of the invention is to provide multiple V-groove pulleys formed of contacting, circular, sheet metal members requiring the use of only two distinct dies, to press the members from sheet steel or the like.

Another object of the invention is to provide multiple V-groove pulleys that are light in weight, compact yet durable and relatively inexpensive to manufacture.

Other objects and advantages of this invention will appear from a reading of the specification and of the drawings accompanying the same and forming a part thereof and on which like reference numerals are used to designate the same elements or parts throughout the various views.

Figure 1:
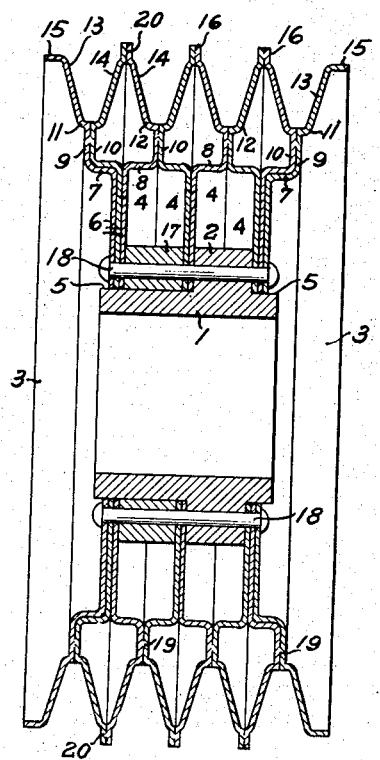
Figure 1 is a central, axial sectional view of a four-groove pulley constructed according to this invention.
Figure 2:
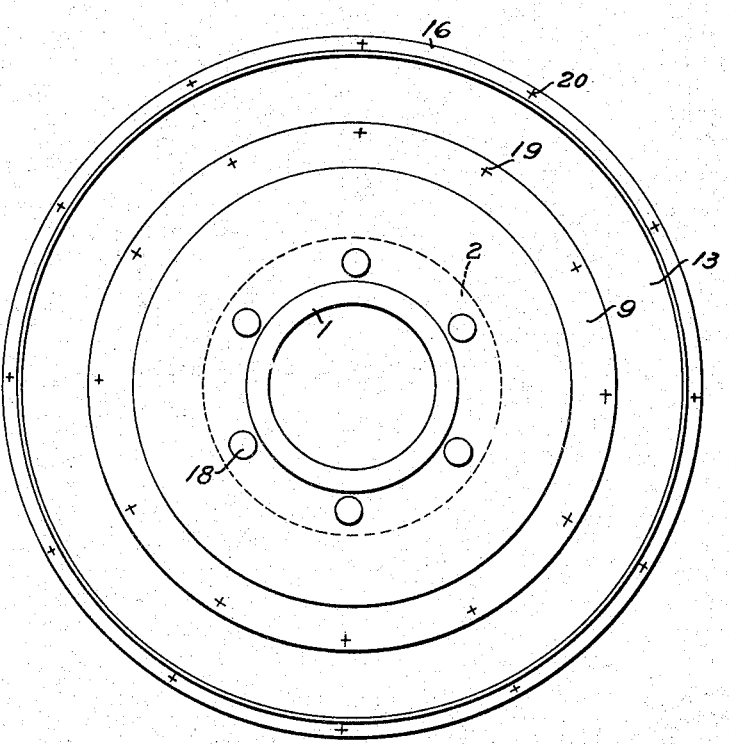
Fig. 2 is a side elevational view of the pulley shown in Figure 1.

Referring to Figure 1, the hub member 1, which may surround and be secured to a power shaft in any suitable manner, provides uniform diameter cylindrical surfaces 5 for mounting the two sets of sheet metal shell members comprising nesting or outer shell members 3 and nested or inner shell members 4 thereon. These surfaces may equally well be provided directly by the power shaft. The nesting and nested members 3, 4 of pressed sheet metal are provided with central circular base or disk portions 6 having circular central openings therein so that they may be mounted directly on said surfaces 5. The nesting or outer shell members 3 have terminating in their disk portions 6 annular offset shoulder portions 7 which in turn terminate in radially extending flat side contacting flange portions 9 directed parallelly to the disk portions 6. The side contacting flange portions 9 of the nesting outer members 3 are provided with shoulders 11 to provide stiffness to the inclined or flared annular driving flanges 13 terminating therein and to somewhat shorten the necessary length of the flanges 13. In order to avoid cutting of the outer belts, operating in the outer grooves of the pulleys, by the flanges 13, these flanges are formed to terminate in axially directed annular flanges 15 which further augment the stiffness and strength of the peripheral portions of nesting members 3.

The nested or inner shell members 4 are similarly provided with central circular base or disk portions 6 having like circular central openings for mounting them on common cylindrical surfaces 5. And these disk portions 6 terminate in annular offset shoulder portions 8 having diameters slightly larger than the diameters of the annular offset portions 7 of the nesting outer members 3, so that any two of the nested inner members 4 may be directly seated on the offset portions 7 of the nesting members 3. The annular offset shoulder portions 8 of the nested members 4 similarly terminate in flat side contacting flange portions 10 which terminate in shoulders 12 formed at substantially the same radial distance as the shoulders 11 of the nesting members 3 and provided for the same purpose. Beyond the shoulders 12, the nested members 4 are provided with inclined, or flared annular flanges 14 having the same inclination as the inclined, annular flanges 13 of the nesting members 3 and the flanges 14 terminate substantially at the same radial distance as the axially directed flanges 15 of the nesting members 3. In order that the pairs of oppositely disposed nested members 4 may be joined as by welding at their peripheries the inclined, annular flanges 14 thereof are made to terminate in diametrically directed annular flanges 16 located in the planes determined by the disk portions 6.

In forming a four-groove pulley of the two sets of pressed sheet metal members described above, it will be noticed from Figure 1, that an inner nested member 4 contacts with each one of the two outer, oppositely disposed nesting members 3 and each of these nested members 4 has positioned in contacting relation thereto another oppositely disposed nested member 4, to form two outer pairs of nested members, which results in two groups each composed of three central disk portions 6 being positioned in spaced relation for mounting on the surfaces 5. To complete the four-grooves, another pair of nested members 4, oppositely disposed with respect to each other, is positioned between the nested members already described, with their side contacting portions 10 in engagement with the cooperating side contacting portions 10 of the adjacent nested members 4. These inserted nested members 4 then will have their central disk portions 6 positioned for mounting on the surface 5, at a point intermediate the two groups of central disk portions 6, just described. One of the spaces between these two groups of central disk portions 6 is filled by a spacing ring 17 and the space between the other of said groups of central disk portions 6 and the adjacent disk portions of the inserted nested members 4 may be occupied or may be filled by an annular flange 2 formed as an integral part of the hub member 1 or of a power shaft on which the nesting and nested members 3, 4 may alternatively be directly mounted. The three groups of central disk portions 6, as shown, are fixed in non-rotative relation with respect to the hub member 1 by means of rivets 18 passing through registering, circularly disposed openings in the disk portions 6 of the members 3, 4, in the spacing ring 17 and in the flange 2 of the hub member 1.

Figure 3:
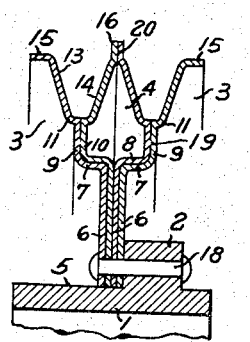
Fig. 3 is a fragmentary, central, axial sectional view of a two-groove pulley constructed according to this invention.

The described two sets of sheet metal members, having the forms described above, may readily be arranged as shown in Fig. 3 to provide a two-groove pulley. In this case the two nesting members 3 described in connection with the four-groove pulley shown in Figure 1 are similarly related as described for the four-groove pulley. In the construction of this pulley, it will be seen from Fig. 3, that only two nested members 4 are required and these are completely nested within the nesting members 3 and that the disk portions 6 of the members are in common contacting relation so that they may be secured by the rivet means described above directly to the engaged surface of a flange 2 provided in a hub member 1 or directly on a power shaft.

Figure 4:
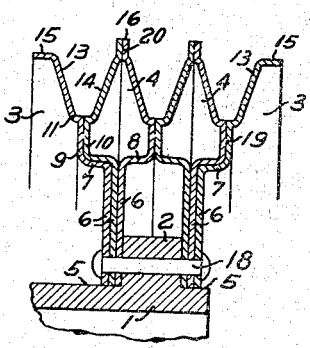
Fig. 4 is a fragmentary, central, axial sectional view of a three-groove pulley constructed according to this invention.

Fig. 4 shows a three-groove pulley, constructed in accordance with this invention, and it will be seen that its construction is similar to the construction of the four-groove pulley of Figure 1, except that the described inserted pair of nested members 4 is absent.

The multiple groove pulleys shown in Figs. 1 through 4 are illustrative of a few multiple groove pulleys that may be constructed according to this invention and it is to be understood that the invention in pressed sheet metal pulleys is not limited to pulleys having the number of grooves shown in these figures of the drawings, since pulleys of greater numbers of grooves may be constructed, within practical limits, by merely adding the necessary spacing rings 17 and cooperating additional pairs of nested members 4.

Further, the description of the multiple groove pulleys shown in Figs. 1 through 4 has been given more or less with relation to their assembled conditions. Since in practice it is desirable to spot weld at spaced points through the side contacting portions 9, 10 of the nesting and nested members 3, 4 they are so welded and therefore the members 3, 4 must be stacked or brought to the shown and described assembled relation by operating on the pairs as determined by said spot welding, as will follow from the description as above presented. These spot welds have been represented as crosses and are designated by the reference numerals 19. After the necessary nesting and nested members 3, 4 have been welded as described and brought to the required assembled operative relation, the diametrically directed peripheral flanges 16 of the nested members 4 are likewise joined by spot welds designated by the reference numerals 20. Spot welding at these described places effectively prevents relative rotation and axial separation of the mmebers 3, 4 comprising a pulley, when the same is carrying or transmitting a load through cooperating V-belts and assures the desired stiffness and rigidity of the peripheral groove-defining portions of the pulleys.

Figures 5, 6, 7 and 8 illustrate a modified form of multiple groove pulley construction also using two sets of circular nesting and nested members but wherein the feature of providing the side contacting portions 9, 10 respectively, in the nesting and nested members of the type of pulley construction shown in Figures 1 to 4 is foregone and wherein the arrangement of the nesting and nested members is somewhat different from the arrangement of these members in Figures 1 to 4.

Figure 5:
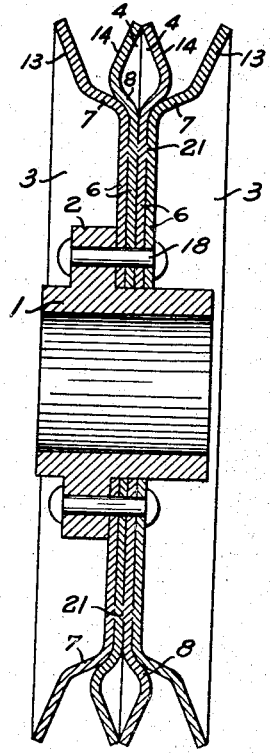
Fig. 5 is a central, axial sectional view of a two-groove pulley comprising modified sets of circular nesting and nested members.
Figure 6:
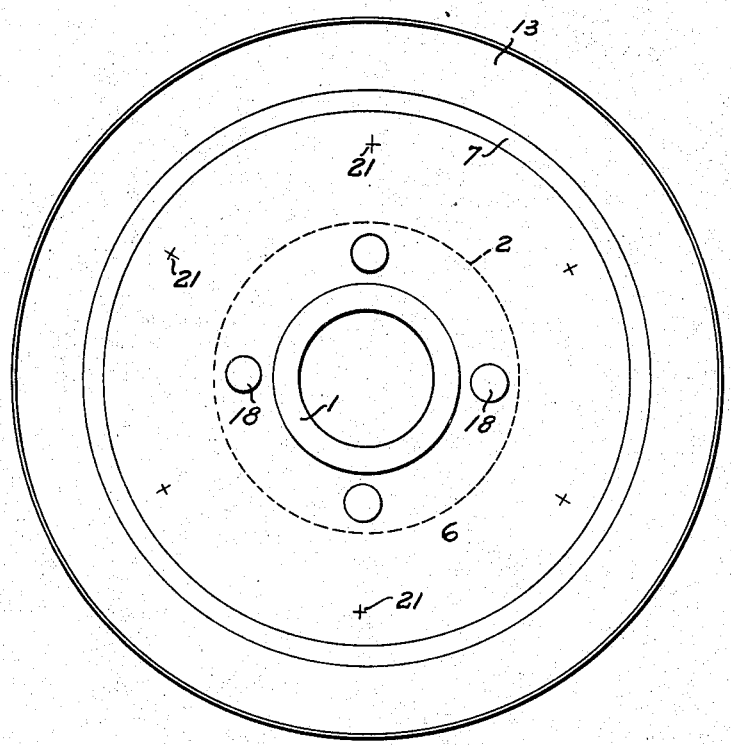
Fig. 6 is a side view of the pulley shown in Fig. 5.

Figure 5 shows a two-groove pulley and is comprised of nesting members 3 and nested members 4 each having a central disk portion 6 and an inclined, annular flange 13 or 14, respectively. The intermediate portions between the flanges 13 and the disk portions 6 of the nesting members 3 as well as the portions between the flanges 14 and disk portions 6 of the nested members 4 are formed by desirably curved annular offset portions 7 and 8 which terminate respectively in the flanges 13, 14 and in the disk portions 6 whereby curved annular seats rather than circumferential seats as in the pulleys of Figures 1 to 4 are provided. The peripheral portions of the flanges 13 and 14 respectively, of the nesting and nested members 3, 4 of Figure 5 are not provided with flanges corresponding to the axially directed flanges 15 and the diametrically directed flanges 16 of the corresponding members of Figures 1 to 4. This dissimilarity of the forms of the nesting and nested members of Figure 5 as distinguished from the forms of the nesting and nested members of Figures 1 to 4 permits the use of nesting members 3 intermediate two spaced oppositely disposed nesting members 3 to form greater number of groove pulleys than two-groove pulleys.

Figure 7:
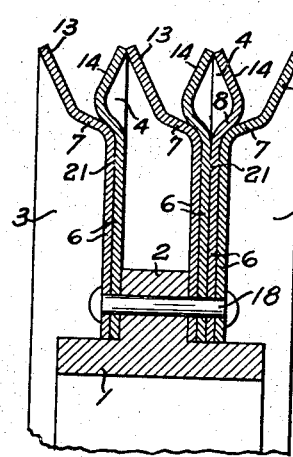
Fig. 7 is a fragmentary, central, axial sectional view of a modified form of three-groove pulley using the modified sets of nesting and nested members of the pulley shown in Fig. 5.
Figure 8:
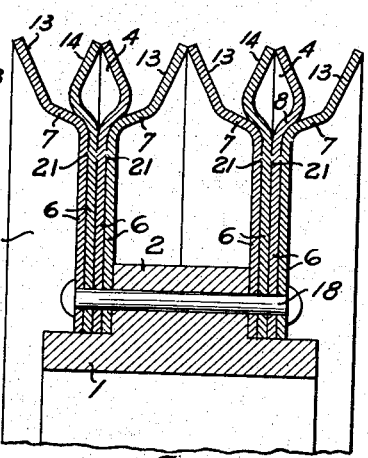
Fig. 8 is a fragmentary, central, axial sectional view of a modified form of four-groove pulley also using the modified sets of nesting and nested members shown in Fig. 5.

Such an arrangement is disclosed by Figures 7 and 8 which embody respectively three and four-groove pulleys each using the modified sets of nesting and nested members 3, 4 shown in Figure 5. The arrangement of the two sets of circular nesting and nested members to provide pulleys having odd numbers of grooves greater than three as seen from Figures 7 and 8 is such that the desired feature of having symmetry about a diametrical plane passing through a medial portion of the groove periphery of these odd number groove pulleys is lost at the gain of requiring a lesser number of the separate spacing rings 17 of Figure 1 than is required by the arrangement of forming pulleys disclosed by Figure 1 to form four-groove and greater number of groove pulleys, as is apparent.

Since the modified sets of circular nesting and nested members used in the pulley constructions of Figs. 5, 6, 7, and 8, lack the distinct, flat side contacting portions 9, 10 of the nesting and nested members of Figure 1, it is necessary to join the disk portions of each of the groups of contacting disk portions 6 together adjacent the portions 7 and 8 by rivets or by circularly disposed spot welds 21.

Figure 9:
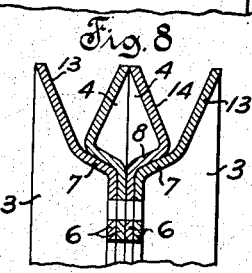
Fig. 9 is a fragmentary, central, axial sectional view of a two-groove pulley comprising further modified sets of nesting and nested members, the view being broken within the boundary of the central openings in the disk portions of the pulley.

Figure 9 shows a fragment of a two-groove pulley using further modified sets of circular nesting and nested members whereby flat surface contacting relations are present between portions 7 and 8 of the nesting and nested members 3, 4 respectively located intermediate the flanges 13 and the disk portions 6 and the flanges 14 and the disk portions 6.

Figure 10:
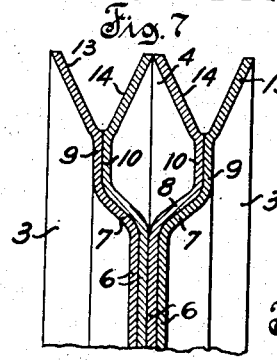
Fig. 10 is a fragmentary, central, axial sectional view of a two-groove pulley comprising still further modified sets of nesting and nested members, the view being broken beyond the boundary of the central openings in the disk portions of the pulley.

Figure 10 is a fragment of a two-groove pulley using further modified sets of nesting and nested members 3, 4 respectively, and distinguishing essentially only from the sets of nesting and nested members 3, 4 shown in Figures 1 through 4 in that the portions 7, 8 thereof are inclined, annular portions whereas the corresponding portions of the nesting and nested members of Figures 1 through 4 are circumferential annular portions.

Figure 11:
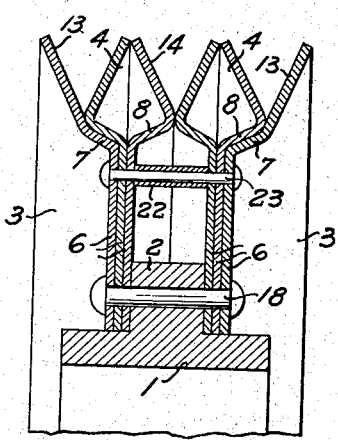
Fig. 11 is a central, axial sectional view of a three-groove pulley using the modified sets of nesting and nested members shown in Fig. 9.

Figure 11 shows a three-groove pulley constructed according to the arrangement disclosed by Fig. 4, but comprising the specific sets of nesting and nested members shown in Figure 9. Since the forms of the nesting and nested members 3, 4 of Figure 9 are such that no separate and distinct flat, side contacting portions are provided to permit welding at these places of the contacting nested members 4 the pairs of nested members 4 shown in Figure 11 must be maintained at the proper spaced relation and be rigidly secured to the nesting members 3 by means such as circularly disposed spacing sleeves 22 cooperating with securing rivets 23.

From the above it is seen that the applicant has provided multiple V-groove pulleys, each comprising two sets of pressed circular sheet metal members, formed by the use of only two distinct dies, which members may be arranged as described in connection with Figures 1, 3, 4, 5, 7, and 8, to form pulleys having any number of grooves, within practical limits, and that the pulleys will nearly all have symmetry about diametrical planes passing through the medial portions of the pulleys providing central loading, compactness and a self adjusting condition in the pulleys.

It should be further understood that it is not desired to limit the invention to the exact details of construction herein shown and described, for various modifications within the scope of the claims may occur to persons skilled in the art.

It is claimed and desired to secure by Letters Patent:

1. In a pulley, a pair of nesting sheet metal members, and a plurality of pairs of contacting nested sheet metal members, each of said members having an inclined, annular peripheral flange disposed to cooperate with the flange of an adjacent member to form a V-groove and a central disk portion, and each of said members being provided with an offset portion intermediate its inclined flange and its disk portion, the central disk portion of each outer nested member being in contiguous relationship with the disk portion of one of said pair of nesting members, the central disk portion of each of the remaining nested members being positioned intermediate of the disk portions of said pair of nesting members.

2. In a pulley, a pair of nesting sheet metal members, and a plurality of pairs of contacting nested sheet metal members, each of said members having an inclined, annular peripheral flange disposed to cooperate with the flange of an adjacent member to form a V-groove and a central disk portion, and each member being provided with an offset portion intermediate its inclined flange and its disk portion, the central disk portion of each outer nested member being in contiguous relationship with the disk portion of one of said pair of nesting members and the central disk portion of another of said nested members being in engagement with and positioned intermediate of the disk portions of said pair of nesting members.

3. In a pulley, a pair of nesting sheet metal members, a plurality of pairs of contacting nested sheet metal members, each of said members having an inclined, annular peripheral flange disposed to cooperate with the flange of an adjacent member to form a V-groove and a central disk portion, and each member being provided with an offset portion intermediate its inclined flange and its disk portion, the central disk portion of each outer nested member being in contiguous relationship with the disk portion of one of said pair of nesting members, the central disk portion of another of said nested members being in engagement with and positioned intermediate of the disk portions of said pair of nesting members and means for mounting said members with the disk portions thereof in the described relation.

4. In a pulley, a plurality of nesting sheet metal members, and a plurality of nested sheet metal members, each of said members having an inclined, annular peripheral flange and a central disk portion, and being provided with an annular offset portion intermediate its flange and its disk portion, each flange of the members forming a V-groove with the flange of an adjacent member, the annular offset portions of said nested members being of a diameter larger than the diameter of the annular offset portions of said nesting members, the members being arranged so that the offset portions are in contacting relation.

5. In a pulley, a plurality of nesting sheet metal members, and a plurality of nested sheet metal members, each of said members having an inclined, annular peripheral flange and a central disk portion and being provided with an annular offset portion intermediate its flange and its disk portion, the annular offset portions of said nested members being of a diameter larger than the diameter of the annular offset portions of said nesting members, the members being arranged so that the offset portions and the flanges are in contacting relation.

6. In a pulley, a plurality of nesting sheet metal members, and a like number of nested sheet metal members, each of said members having an inclined, annular peripheral flange and a central disk portion and being provided with an annular offset portion intermediate its flange and its disk portion, each flange of the members forming a V-groove with the flange of an adjacent member, the annular offset portions of said nested members being of a diameter larger than the diameter of the annular offset portions of said nesting members, the members being arranged so that offset portions of the nested members are each in contacting relation with an offset portion of said nesting members.

7. In a device of the class described, a hub member, two oppositely arranged outer shell members on said hub member each comprising a circular base portion around said hub, a shoulder, a radially extending flange portion formed on the outer edge of said shoulder, a flared portion formed on the outer edge of said radially extending flange portion, a plurality of duplicate inner shell members oppositely arranged on said hub and between said two outer shell members each comprising a circular base portion around said hub member, a shoulder portion engaging the shoulder portion of one of said outer shell members, a radially extending flange portion formed on the outer edge of said shoulder portion, a flared portion formed on the edge of said radially extending flange portion, and a means for securing all of said shell members to said hub.

8. In a device of the class described, a hub member, a plurality of duplicate shell members on said hub member each of which is oppositely arranged or turned relative to the shell member adjacent to it; each of said shell members comprising a circular base portion embracing said hub member, a flared portion, a flange on the outer edge of said flared portion, an offset shoulder at the base of said flange, and a means for securing all of said shell members to said hub member.

9. A grooved transmission pulley, comprising a hub, a plurality of oppositely arranged and mutually contacting duplicate shell members carried by said hub, each shell member having a flared belt receiving portion cooperating with the corresponding flared portion of an adjacent shell member to constitute a belt receiving groove, a peripheral radially extending flange disposed to engage the corresponding flange of an adjacent shell to constitute a dividing ridge between belt grooves, and an offset shoulder between said flared portion and said peripheral flange to prevent a belt in said groove from engaging with and becoming worn by said flange.

10. A grooved transmission pulley, comprising a hub; a pair of spaced oppositely disposed outer shell members carried by said hub, each of said outer shell members having a central annular base portion embracing said hub, a longitudinally offset shoulder disposed outwardly of said base portion, a flange extending radially outward from the edge of said shoulder, and an outwardly flared belt receiving portion extending from said flange; and a pair of oppositely disposed inner shell members positioned on said hub between said outer shell members, each of said inner shell members having a central annular base portion embracing said hub and disposed contiguous to the base portion of the adjacent outer shell member, a longitudinally offset shoulder overlying and conforming to the offset shoulder of said outer shell member, a radially extending flange disposed contiguous to the flange of said outer shell member, and an inwardly flared belt receiving portion extending from said flange and cooperating with the outwardly flared belt receiving portion of said outer shell member to form a belt receiving V-groove.

11. A sheave for receiving a V-belt comprising a hub; a pair of one piece inner annular sheet metal members carried by said hub, each of said members presenting at its peripheral portion an inclined wall constituting a belt receiving surface and each of said members being so shaped as to form adjacent to the radially inward margin of said inclined wall a front abutting surface which merges into a reentrant cylindrical flange extending rearwardly from said front abutting surface, and terminating in a central plane portion constituting a back abutting surface and having a central opening engaging said hub, said members being arranged back to back on said hub with said back abutting surfaces and the back edges of said inclined walls in contact respectively and with said reentrant cylindrical flanges in alinement forming with said inclined walls a closed annular hollow structure of great strength and stiffness; and a pair of one piece outer annular sheet metal members carried by said hub in position to enclose and cooperate with said inner pair of members, each of said members of said outer pair presenting at its peripheral portion an inclined wall constituting a belt receiving surface and each of said members being so shaped as to form adjacent to the radially inward margin of said inclined wall a front abutting surface disposed in contact with the front abutting surface of the adjacent inner member, merging into a forwardly extending cylindrical flange underlying and conforming to the cylindrical flange of the inner member, and terminating in a central plane portion in contact with the central plane portion of the inner member and having a central opening engaging said hub; and means for securing said members on said hub with the belt receiving surfaces of said outer members cooperating with the belt receiving surfaces of adjacent inner members to form V-grooves.

ROBERT E. STOLL.